US007916991B2

United States Patent
Kumkar et al.

(10) Patent No.: US 7,916,991 B2
(45) Date of Patent: Mar. 29, 2011

(54) OPTICAL FIBER HAVING CLADDING SCATTERING CENTERS

(75) Inventors: Malte Kumkar, Weimar (DE); Rudolf Huber, Aldingen (DE)

(73) Assignee: TRUMPF LASER GmbH + Co. KG, Schramberg (DE)

( * ) Notice: Subject to any disclaimer, the term of this patent is extended or adjusted under 35 U.S.C. 154(b) by 43 days.

(21) Appl. No.: 12/088,773

(22) PCT Filed: Sep. 28, 2006

(86) PCT No.: PCT/EP2006/009439
§ 371 (c)(1),
(2), (4) Date: Dec. 19, 2008

(87) PCT Pub. No.: WO2007/036364
PCT Pub. Date: Apr. 5, 2007

(65) Prior Publication Data
US 2009/0169162 A1  Jul. 2, 2009

(30) Foreign Application Priority Data
Sep. 29, 2005  (EP) .................................... 05021245

(51) Int. Cl.
*G02B 6/02* (2006.01)
(52) U.S. Cl. ........................................ 385/127; 65/376
(58) Field of Classification Search ............ 385/123–128
See application file for complete search history.

(56) References Cited

U.S. PATENT DOCUMENTS

| 4,637,686 A | 1/1987 | Iwamoto et al. |
| 6,625,363 B2* | 9/2003 | Carter et al. ................... 385/127 |
| 2004/0071420 A1 | 4/2004 | Sezerman et al. |
| 2005/0117860 A1 | 6/2005 | Vienne et al. |

FOREIGN PATENT DOCUMENTS
EP  1 213 594  6/2002

OTHER PUBLICATIONS

The International Search Report and Written Opinion for corresponding PCT Application No. PCT/EP2006/009439, mailed Dec. 19, 2006, 11 pages.
Notification of Transmittal of Translation of the International Preliminary Report on Patentability for corresponding PCT Application PCT/EP2006/009439, mailed May 8, 2008, 7 pages.
Office Action from corresponding Chinese Application No. 200680044841.6, mailed Jul. 24, 2009, 10 pages, with English translation.

* cited by examiner

*Primary Examiner* — Sarah Hahm
(74) *Attorney, Agent, or Firm* — Fish & Richardson P.C.

(57) ABSTRACT

In an optical fiber (1) for the transmission of high-power laser radiation, with a fiber core (2), with an inner fiber cladding (3) surrounding the fiber core (2) for carrying the laser radiation in the fiber core (2), with a first outer fiber cladding (4) surrounding the inner fiber cladding (3), which has a smaller refractive index than the inner fiber cladding (3) as a result of longitudinally aligned air-filled capillaries (5), and with a second outer fiber cladding (6) surrounding the first outer fiber cladding (4), wherein the first outer fiber cladding (4) has a capillary-free longitudinal section (8), the second outer fiber cladding (6) has according to the invention scattering centers (7) at least in the region of the capillary-free longitudinal section (8) for scattering the laser radiation emerging from the inner fiber cladding (3) along the capillary-free longitudinal section (8).

14 Claims, 2 Drawing Sheets

OPTICAL FIBER HAVING CLADDING SCATTERING CENTERS

TECHNICAL FIELD

The invention relates to an optical fibre for the transmission of high-power laser radiation, with a fibre core, an inner fibre cladding surrounding the fibre core for guiding the laser radiation in the fibre core, a first outer fibre cladding surrounding the inner fibre cladding, which has a smaller refractive index than the inner fibre cladding as a result of longitudinally aligned gas-filled capillaries, and with a second outer fibre cladding surrounding the first outer fibre cladding, wherein the first outer fibre cladding has a capillary-free longitudinal section, and to a method for producing such an optical fibre.

Such an optical fibre has become known for example from US 2005/0117860 A.

Optical fibres are used in conjunction with high-power lasers as optical waveguides, in order to carry the laser radiation from the laser over a path to an application, e.g. to a material processing device. Optical waveguides (optical fibres) for the transmission of laser radiation in the kilowatt-power region usually consist of a quartz glass core (optical fibre core) and a quartz glass cladding (optical fibre cladding), which due to suitable doping or micro-structuring has a lower (effective) refractive index than the optical fibre core. The core carries laser radiation up to a maximum acceptance angle by means of total internal reflection. The cladding is not used for light transmission, but provides the lower refractive index necessary for the total internal reflection. To protect the optical fibre a protective sheath made of a flexible material (e.g. silicon, acrylate) is applied to the quartz glass cladding, which in general has a lower refractive index than the quartz glass cladding and partially absorbs the laser radiation.

Optical fibres with a microstructured quartz glass cladding, which are also referred to as "photonic crystal fibers", have a quartz glass cladding, which contains longitudinal, air-filled capillaries, in order to reduce the effective refractive index of the quartz glass cladding. The capillaries extend parallel to the fibre core. The spacing and diameters of the capillaries determine the numerical aperture of the fibre core: the larger the diameter of the capillaries and the closer together they are arranged, the higher is the numerical aperture of the fibre core. The numerical aperture of the fibre core influences the beam quality of the transmitted radiation. A recent design for optical fibres for the transmission of laser radiation of high (peak-pulse) power is offered by hollow fibres, which instead of a solid quartz glass core have a hollow, air-filled core. In these hollow fibres the core is also surrounded by a capillary-threaded quartz glass cladding.

To couple into the optical waveguide fibre, a laser beam is focussed for example on the input end of the fibre. When using this method, part of the laser radiation can also enter the cladding region of the fibre. This occurs in particular during the necessary mutual adjustment of laser beam and optical fibre. Equally, radiation power can enter the cladding region due to backscattering and reflection from the workpiece being processed. This proportion of the laser radiation entering the fibre cladding can also be conveyed by total reflection outside the fibre core, if the optical fibre is surrounded by a flexible protective sheath which has a lower refractive index than that of the cladding region. If,—e.g. at fibre bends or spliced connections—the total reflection of the cladding region is disturbed, then laser radiation can escape from the quartz glass cladding into the protective sheath, or pass through it. Due to radiation absorption in the protective sheath, this can be heated and destroyed. The radiation not carried in the fibre core can lead to damage to the end regions of the fibre in particular. Furthermore, the beam quality of the transmitted laser radiation is worsened, which can adversely affect following optical components and the processing quality.

In the optical fibre known from the above mentioned US 2005/0117860 A, the capillary-free longitudinal section forms a side window, in order to couple light into the inner fibre cladding or out of the inner fibre cladding. The capillary-free longitudinal section can be produced by lengthening the optical fibre, causing the capillaries to collapse in that area and at the same time the fibre core to become tapered. In this tapered fibre core section, higher-order modes propagating in the fibre core are eliminated, that is, the tapered fibre core section acts as a mode filter, wherein the eliminated higher-order modes propagate in the inner fibre cladding.

From U.S. Pat. No. 4,637,686 an optical fibre is known with an outer fibre cladding surrounding the inner fibre cladding, which over its entire length has substances for the dispersal or absorption of light propagating in the fibre cladding. The outer fibre cladding has a higher refractive index than the inner fibre cladding, so that light in the inner fibre cladding is not guided by total reflection and enters the outer fibre cladding, where after only a short distance it is dispersed or absorbed by the substances.

From US 2004/0071420 A a further optical fibre is known, which has one or more zones with constantly varying refractive index, so that light propagating in the fibre core can escape into the fibre cladding.

Finally, EP 1 213 594 A discloses another optical fibre, the fibre cladding of which has scattering elements.

By contrast, it is the object of the present invention to reduce, as simply as possibly, negative effects caused by laser radiation entering the cladding region in an optical fibre of the above mentioned type, without affecting the radiation-guiding characteristics of the fibre core.

The object is acchieved according to the invention in that the second outer fibre cladding has scattering centres, at least in the region of the capillary-free longitudinal section, for scattering the laser radiation emerging from the inner fibre cladding along the capillary-free longitudinal section. The capillary-free longitudinal section can extend annularly over the entire circumference, or only over part of the circumference of the optical fibre.

In such an optical waveguide fibre according to the invention, radiation coupled into the inner fibre cladding is reliably carried until it impinges on the capillary-free longitudinal section. There, the radiation carried in the inner fibre cladding passes into the second outer fibre cladding, undergoes a change of angle at the scattering centres and is thus deliberately extracted from the fibre. The radiation-guiding characteristics of the fibre core along the capillary-free longitudinal section remain largely unaffected.

The fibre core can consist of doped or undoped quartz glass, or be formed by the gas-filled, in particular air-filled, cavity of a hollow fibre.

In a preferred embodiment, the inner fibre cladding consists of doped quartz glass, the doping of which is chosen in such a way that the inner fibre cladding has a smaller refractive index than the fibre core. A suitable doping for reducing the refractive index of the inner fibre cladding, in the case of quartz glass for example, consists of fluoride ions.

In another preferred embodiment, the inner fibre cladding has a smaller refractive index than the fibre core, as a result of longitudinally aligned gas-filled, preferably air-filled, capillaries. The capillaries arranged in the first outer fibre cladding have a larger diameter than the capillaries of the inner fibre cladding and are arranged closely adjacent to one another, in such a way that a similar value to that of air results for the refractive index of the first outer fibre cladding. In this way laser radiation, which has been coupled into the inner fibre cladding, is guided within the inner fibre cladding by total reflection and can be selectively coupled out at specific points.

Preferably, the first and second outer fibre cladding consists of quartz glass.

The second outer fibre cladding preferably has scattering centres over its entire length. Alternatively, the scattering centres can also extend only over limited sections of the length of the optical fibre, i.e. they can be introduced into the outer fibre cladding selectively as extraction points. The scattering centres can be air-filled bubbles or micro-crystals, and can be introduced into the second outer fibre cladding by means of an appropriately structured preform (quartz glass with bubbles or micro-crystals), or by irradiation of the fibre using ultra-short laser pulses. To generate gas bubbles over the entire length of the second outer fibre cladding the optical-fibre preform has an outermost layer made of opaque quartz, i.e. quartz containing air bubbles. To generate microcrystallites in the second outer fibre cladding during the production of the synthetic quartz glass for the fibre preform, the process can be controlled in such a way that microcrystallites are formed. When drawing the optical fibre these micro-crystals remain as scattering centres. Alternatively, nano-particles can be introduced in the region of the preform which after the drawing process forms the second outer fibre cladding. Preferably, the scattering centres are only provided in an inner space of the second outer fibre cladding far from the surface, so that the boundary surface adjacent to the first outer cladding and the surface of the second outer cladding have no flaws. The mechanical strength of the optical fibre is thus affected as little as possible. To generate scattering centres selectively in specific length sections of the already drawn fibre, the fibre is irradiated with an ultra-short pulsed laser. The wavelength of the laser beam is chosen such that the fibre material is largely transparent to the laser beam up to a specific power density of the beam. If this power density is reached in the focus of the laser beam, then due to microscopic damage to the quartz material a scattering centre is formed. The laser beam is directed onto the optical fibre in such a way that the focal point of the laser beam lies in the second outer fibre cladding.

If the optical fibre is surrounded by a protective sheath which does not have an adequate performance capability, then this can be removed along the capillary-free longitudinal section. The second outer fibre cladding is then advantageously surrounded by an absorber along the capillary-free longitudinal section. It is moreover possible to arrange a power measurement sensor on the capillary-free longitudinal section, in order thus to measure the radiation power carried in the inner fibre cladding. This is advantageous in particular during the mutual adjustment of laser beam and optical fibre.

The invention also relates to a method for producing a high-performance optical fibre constructed as above, wherein an optical fibre with a fibre core, an inner fibre cladding surrounding the fibre core, a first outer fibre cladding surrounding the inner fibre cladding, which has a smaller refractive index than the inner fibre cladding as a result of longitudinally aligned gas-filled capillaries, and with a second outer fibre cladding surrounding the first outer fibre cladding, which has scattering centres on a longitudinal section or over its entire length, is heated on a longitudinal section and the capillaries of the first outer fibre cladding present in this longitudinal section are thereby removed. In other words, the capillary structure of the first outer fibre cladding is collapsed on the desired longitudinal sections by heating, without substantially affecting the structures of the remaining fibre layers. The heating of the optical fibre takes place for example in a gas flame, by heat radiation from a resistance-heated element or with the aid of a laser. If the capillary structure of the first outer fibre cladding collapses, then at this point the total reflection of the radiation carried in the inner fibre cladding is removed, and the radiation is coupled over into the second outer fibre cladding. There it is scattered out of the optical fibre at the scattering centres. The collapsing of the capillary structure of the first outer fibre cladding preferably takes place over the entire circumference of the optical fibre.

The invention also relates to the use of an optical fibre constructed as above for the transmission of high-power laser radiation. This involves the laser radiation reaching the inner fibre cladding being carried reliably in the inner fibre cladding as far as the region of the capillary-free longitudinal section. There the laser radiation passes out of the inner fibre cladding into the second outer fibre cladding, is scattered at the scattering centres out of the optical fibre and captured in an absorber surrounding the optical fibre.

The inventive optical fibre cannot only be used as an optical waveguide for the transmission of laser radiation from the laser to a processing site, but can also be deployed directly inside a laser resonator or a laser amplifier. There it acts as a loss element for higher laser modes, which are selectively coupled out at the capillary-free longitudinal sections of the fibre.

Further advantages and advantageous configurations of the subject matter of the invention can be found in the description, the drawing and the claims. The above cited and the additional features listed can each be used equally well alone or in groups in arbitrary combinations. The embodiments shown and described are not to be understood as an exhaustive list, but rather have an exemplary character for describing the invention.

BRIEF DESCRIPTION OF THE DRAWINGS

The optical fibre 1 shown in FIG. 1 and FIG. 2 is used for the transmission of laser radiation at high power (>500 W). The fibre 1 comprises a fibre core 2 made of undoped or doped quartz glass, an inner fibre cladding 3 surrounding the fibre core 2 made of doped, in particular fluorine-doped quartz glass of smaller refractive index than the fibre core 2, a first outer fibre cladding 4 made of quartz glass surrounding the inner fibre cladding 3, which has a smaller refractive index than the inner fibre cladding 3 as a result of longitudinally aligned air-filled capillaries 5, and a second outer fibre cladding 6 made of quartz glass surrounding the first outer fibre cladding 4, which has scattering centres 7 over its entire length. The first outer fibre cladding 4 has a thinner, capillary-free longitudinal section 8, on which the second outer fibre cladding 6 is surrounded by an absorber 9.

Figure 1:
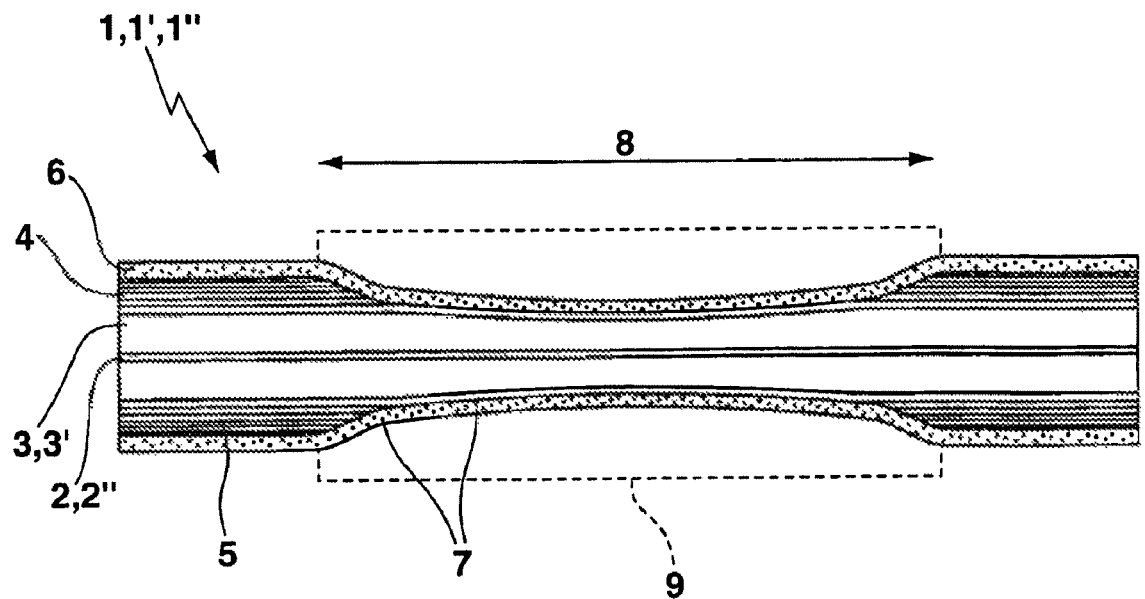
FIG. 1 the inventive optical fibre in the region of a capillary-free length in longitudinal section.
Figure 2:
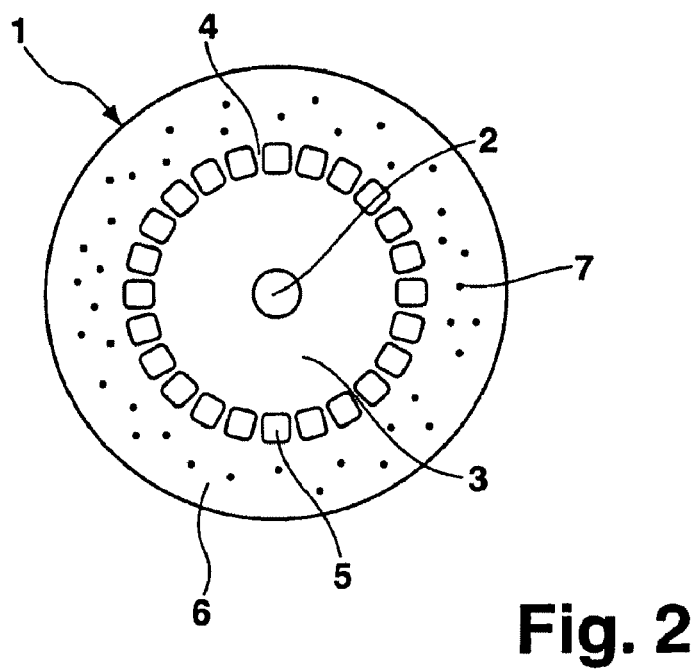
FIG. 2 the cross-section of the optical fibre shown in FIG. 1.

The fibre core 2 carries laser radiation up to a maximum acceptance angle by means of total internal reflection. The inner fibre cladding 3 is not used for transmitting light, but provides the lower refractive index necessary for the total internal reflection, which is adjusted appropriately via the doping. Laser radiation, which nevertheless—e.g. when coupling the laser radiation into the fibre core 2—enters the inner fibre cladding 3, is carried therein by means of total reflection, as the first outer fibre cladding 4 has a lower refractive index than the inner fibre cladding 3 as a result of its longitudinally aligned air-filled capillaries 5. The capillaries 5 extend parallel to the fibre core 2. On the capillary-free longitudinal section 8 this total reflection is removed for the laser radiation carried in the inner fibre cladding 3, which therefore emerges along the capillary-free longitudinal section 8 into the second outer fibre cladding 6, undergoes a change of angle at the scattering centres 7 there and is coupled out from the optical fibre 1 into the absorber 9. The radiation-guiding characteristics of the fibre core 2 along the capillary-free longitudinal section 8 remain largely unaffected.

Figure 3:
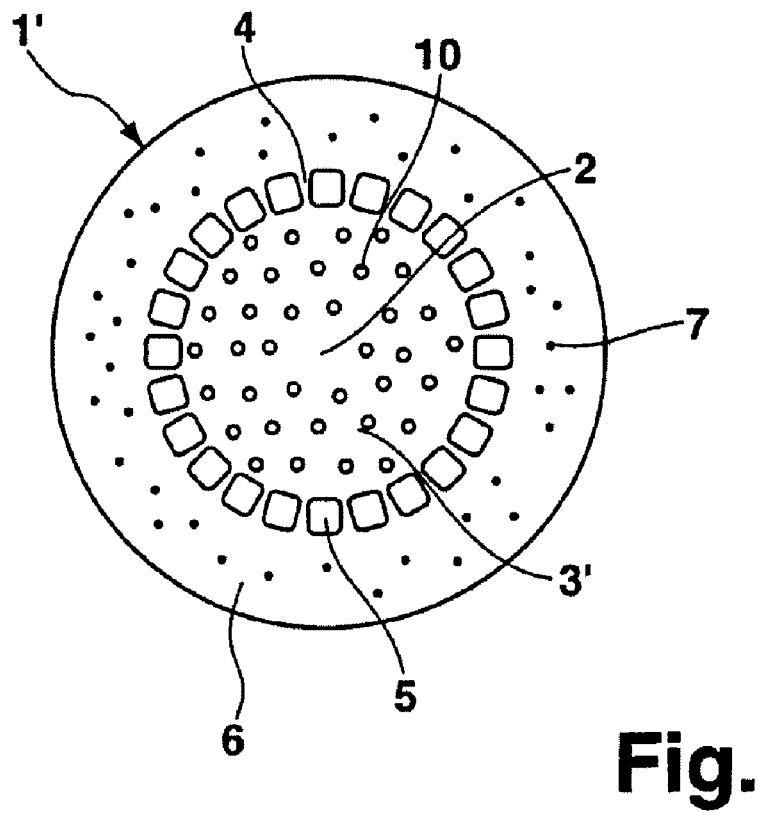
FIGS. 3 and 4 two other cross-sectional embodiments of the inventive optical fibre shown in FIG. 1.

The fibre 1' shown in FIG. 3 differs from the optical fibre 1 only in that here the inner fibre cladding 3' has a microstructure in the form of longitudinally aligned air-filled capillaries 10 and consequently a refractive index lower than that of the fibre core 2. The capillaries 10 extend parallel to the inner fibre cladding 3'. These capillaries typically have a diameter in the region of 1 µm and a mutual spacing that exceeds the diameter by around an order of magnitude, such that a numerical aperture of 0.05 to 0.2 results for the fibre core. Laser radiation with a beam quality of 0.2 mm mrad to 20 mm mrad can therefore be transmitted in the optical fibre. To increase the stability of the fibre 1', a further unstructured quartz layer (not shown) can be arranged between the inner fibre cladding 1' and the first outer fibre cladding 5.

Figure 4:
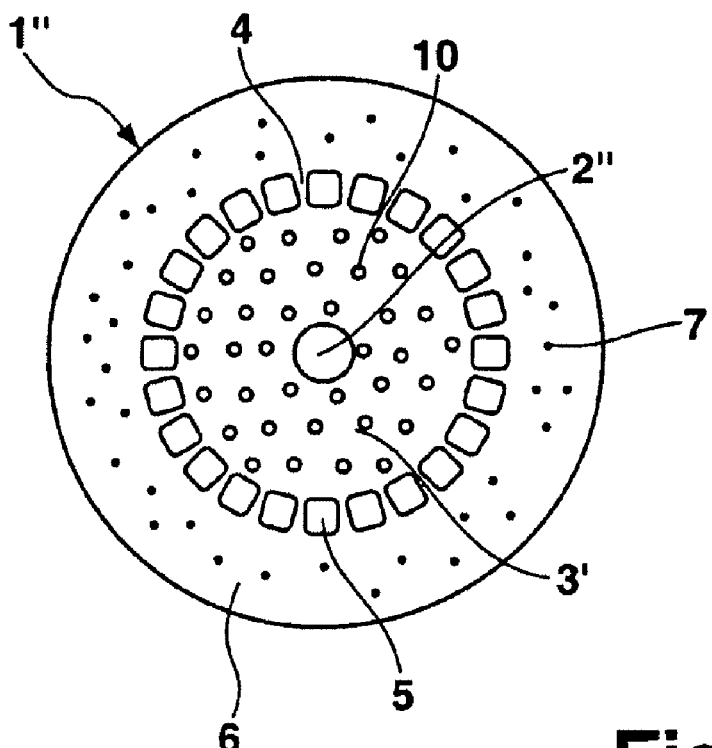

The fibre 1" shown in FIG. 4 differs from the optical fibre 1' in that here the fibre core 2" is formed by the cavity of an air-filled hollow fibre.

What is claimed is:

1. An optical fiber for the transmission of high-power laser radiation, comprising:
    a fiber core;
    an inner fiber cladding surrounding the fiber core and being configured to carry the high-power laser radiation in the fiber core, wherein the inner fiber cladding is constructed for carrying the high-power laser radiation in the fiber core as a result of longitudinally aligned gas-filled capillaries within the inner fiber cladding;
    a first outer fiber cladding surrounding the inner fiber cladding, the first outer fiber cladding having a smaller refractive index than the inner fiber cladding and having a longitudinal section that is free of capillaries;
    an outermost fiber cladding surrounding the first outer fiber cladding; and
    scattering centers provided at least in an inner space of the outermost fiber cladding that circumferentially surrounds the longitudinal section that is free of capillaries, wherein the scattering centers are arranged to scatter laser radiation emerging from the inner fiber cladding through the first outer fiber cladding along the longitudinal section that is free of capillaries.

2. The optical fiber of claim 1, wherein the fiber core includes doped or undoped quartz glass.

3. The optical fiber of claim 1, wherein the fiber core is formed by the inner cavity of a hollow fiber.

4. The optical fiber of claim 1, wherein the inner fiber cladding includes doped quartz glass, the doping of which is chosen in such a way that the inner fiber cladding has a lower refractive index than a refractive index of the fiber core.

5. The optical fiber of claim 1, wherein the first outer fiber cladding includes quartz glass.

6. The optical fiber of claim 1, wherein the outermost fiber cladding includes quartz glass.

7. The optical fiber of claim 1, wherein the outermost fiber cladding includes scattering centers over its entire length.

8. The optical fiber of claim 1, wherein the scattering centers in the outermost fiber cladding are arranged only in an inner space of the outermost fiber cladding far from a boundary surface of the outermost fiber cladding that is adjacent to the first outer fiber cladding.

9. The optical fiber of claim 1, wherein the outermost fiber cladding is surrounded along the longitudinal section that is free of capillaries by an absorber.

10. The optical fiber of claim 1, wherein the fiber core has a constant diameter over an entire length of the optical fiber.

11. A method for producing an optical fiber that includes a fiber core, an inner fiber cladding surrounding the fiber core, a first outer fiber cladding surrounding the inner fiber cladding, an outermost fiber cladding surrounding the first outer fiber cladding, wherein the first outer fiber cladding has a smaller refractive index than the refractive index of the inner fiber cladding, the method comprising:
    providing scattering centers in at least an inner space of the outermost fiber cladding, wherein the scattering centers surround a longitudinal section of the optical fiber; and
    heating the optical fiber at the longitudinal section to thereby remove longitudinally-aligned capillaries present in the first outer fiber cladding along the longitudinal section.

12. The method of claim 11, further comprising providing the scattering centers over an entire length of the outermost fiber cladding.

13. An optical fiber for the transmission of high-power laser radiation, comprising:
    a fiber core;
    an inner fiber cladding surrounding the fiber core and being configured to carry the high-power laser radiation in the fiber core;
    a first outer fiber cladding surrounding the inner fiber cladding, the first outer fiber cladding having a longitudinal section that is free of capillaries, wherein the first outer fiber cladding includes at least a different section that includes longitudinally-aligned capillaries, wherein the longitudinally-aligned capillaries within the first outer fiber cladding cause the first outer fiber cladding to have a refractive index that is smaller than the refractive index of the inner fiber cladding;
    an outermost fiber cladding surrounding the first outer fiber cladding; and
    scattering centers provided at least in an inner space of the outermost fiber cladding that circumferentially surrounds the longitudinal section that is free of capillaries, wherein the scattering centers are arranged to scatter laser radiation emerging from the inner fiber cladding through the first outer fiber cladding along the longitudinal section that is free of capillaries.

14. The optical fiber of claim 13, wherein the longitudinally-aligned capillaries are air filled.

* * * * *